Patented May 6, 1952

2,595,334

UNITED STATES PATENT OFFICE 2,595,334

BENZOTHIAZOLESULFONAMIDES AND METHOD OF PREPARING THE SAME

James W. Clapp, Darien, and Richard O. Roblin, Jr., Riverside, Conn., assignors to American Cyanamid Company, New York, N. Y., a corporation of Maine No Drawing. Application April 8, 1950, Serial No. 154,884

12 Claims. (Cl. 260—306.6)

This invention relates to substituted benzothiazolesulfonamides and to methods of preparing said compounds.

It is generally recognized that numerous functions and actions of the human body are largely controlled by a wide variety of enzymes. One of these numerous enzymes is called carbonic anhydrase because it is involved in the metabolism of carbon dioxide. This enzyme has other functions too, since it can catalyze the conversion of carbon dioxide to carbonic acid. The excretion of acid by the kidneys is thought to be due to this function of carbonic anhydrase.

The excretion of acid by the kidneys is one method by which the body normally conserves salt. The maintenance of a constant ratio of salt to water in the body is of utmost importance for general health. In some cases, however, excess salt and water accumulate in the tissues causing a condition which is called edema. It is frequently encountered in association with congestive heart failure. The excess salt and water cause an uncomfortable swelling of the tissues and place an added strain on the heart. To combat this condition so-called diuretic agents are sometimes used to promote the excretion of the excess salt and water. These agents, for the most part, in the past, have been mercury derivatives. Since these compounds contain mercury, they are not without toxicity on continued use, and must be administered by injection.

Shortly after sulfanilamide came into wide spread use, Mann and Keilin, Nature, 146, 164 (1940), found that it, but none of the other sulfa drugs, specifically inhibit the enzyme carbonic anhydrase. Within the past year or two sulfanilamide was experimentally used in several cases of congestive heart failure. While the sulfanilamide helped to promote the excretion of excess salt and water, it was not sufficiently active to be safely administered in adequate doses.

We have now found that substituted benzothiazolesulfonamides show much greater activity than sulfanilamide in inhibiting carbonic anhydrase. These compounds are new and may be illustrated by the following general formula:

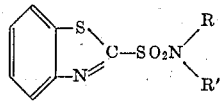

in which R and R' are hydrogen, alkyl or heterocyclic radicals. The benzene portion of the benzothiazole nucleus may also have present substituents such as halogen, alkyl, alkoxy, hydroxyl and the like.

The compounds of the present invention are, in general, white crystalline solids, soluble in most organic solvents and having definite melting points.

The compounds are prepared by dissolving a mercapto-benzothiazole in an aqueous acid solution and passing in chlorine gas to produce the corresponding sulfonyl chloride. This product is then treated with an excess of ammonia in the form of liquid ammonia or ammonium hydroxide to produce the unsubstituted sulfonamides and with an alkylamine or a heterocyclic amine to produce compounds substituted on the sulfonamide group.

The reaction time is not particularly critical but chlorine should be added at such a rate that the temperature does not rise excessively and until an excess is present in the reaction mixture. The temperature during the chlorination is preferably maintained within the range of —10° C. to 25° C. However, during the reaction of the sulfonyl chloride with ammonia or an amine, the temperature may be increased to about 60° C., depending upon the volatility of the particular amine. Obviously the reaction should be carried out at a temperature below the boiling point of the amine.

The compounds of the present invention are active against certain micro-organisms and are also highly effective as inhibitors of carbonic anhydrase and for this reason, may be effective in the relief of edema associated with congestive heart failure or in other conditions where inhibition of carbonic anhydrase is useful.

The following examples illustrate the preparation of representative benzothiazolesulfonamides from the corresponding mercaptobenzothiazole. All parts are by weight unless otherwise indicated.

EXAMPLE 1

2-benzothiazolesulfonamide 110 parts of 2-mercaptobenzothiazole (powdered) are suspended in a mixture of 550 parts of glacial acetic acid and 1100 parts of water. This mixture is stirred rapidly in a cooling bath while chlorine is introduced in multiple fine streams at a rapid rate for about three hours. The temperature of the mixture is held below 8° C. to minimize decomposition. The chlorine treatment is continued until a test of the suspended solid shows it to be mostly soluble in ethylene chloride; this requires a large excess of chlorine. The crude product is unstable at ordinary temperatures, but is more stable after purification. The crude 2-benzothiazolesulfonyl chloride is then filtered and washed thoroughly with ice-cold water. It can be recrystallized from a large volume of ether or petroleum ether and when pure it forms white crystals, melting point 108°–110° C.

30 parts of damp 2-benzothiazolesulfonyl chloride is added to 60 parts of concentrated ammonium hydroxide ($d=0.90$) with good stirring. The temperature of the mixture is not critical up to at least 40° C. The mixture is stirred for one to two hours, then filtered. The filtrate is treated with activated charcoal, then refiltered, and the product precipitated by neutralization, filtered, washed with water and dried. It is purified by recrystallization from ethylene chloride or from a large volume of water or by repeated solution in dilute alkali and reprecipitation with acid. Impurities are removed from solution with activated charcoal. The pure product is a white crystalline solid, melting point 177.5° C., with bubbling. The yield based on 2-mercaptobenzothiazole was about 36%.

The yields are improved somewhat by the use of excess anhydrous liquid ammonia for reaction with the sulfonyl chloride. The excess ammonia is then allowed to evaporate and the crude sulfonamide is purified as indicated above. Yields up to 58% (crude) are obtained by this method.

EXAMPLE 2

2-benzothiazolesulfon-n-propylamide

Six parts of purified 2-benzothiazolesulfonyl chloride are added gradually to 50 parts of dry n-propylamine, with stirring and chilling. The mixture is stirred for an additional period and the excess amine then evaporated. The residue is triturated with water to produce crystallization. The solid is filtered and washed with water, then redissolved in an excess of dilute sodium hydroxide. The solution is treated with activated charcoal, filtered, and neutralized with acid. The precipitate is filtered, washed with water, and dried, then recrystallized from a large volume of carbon tetrachloride. Yield, 96% of theoretical. The pure product is a white, crystalline solid, melting point 101°–101.5° C. It is soluble in ethyl acetate, ethylene chloride, benzene, hot carbon tetrachloride and hot hexane.

EXAMPLE 3

2-benzothiazolesulfon-di-n-butylamide

Six parts of purified 2-benzothiazolesulfonyl chloride are added gradually to 50 parts of di-n-butylamine, with stirring and chilling. The mixture is stirred two hours longer without chilling, then allowed to stand two days. Water is added, and the mixture is acidified. The precipitate is then filtered, washed, and dried. It can be recrystallized from hexane. Yield, 93% of theoretical. The pure compound is a white crystalline solid, insoluble in water, but soluble in most organic solvents and has a melting point of 89.5°–90.5° C.

EXAMPLE 4

N-(2-thiazolyl) benzothiazole-2-sulfonamide 7.4 parts of purified 2-benzothiazole sulfonyl chloride are added gradually to a mixture of 20 parts of 2-aminothiazole and 50 parts of dry pryidine with stirring and chilling. Solution is soon complete. Stirring is continued for about ½ hour without chilling, and the mixture allowed to stand for two days. Water is added, precipitating a gum. The mixture is acidified, and the gum then washed well with water. It is then extracted with dilute alkali, and filtered. The filtrate is neutralized with acid; the product slowly crystallizes. It is filtered, and again extracted with dilute alkali and filtered. Acidification of the filtrate again gives slow crystallization. The product is filtered, dried, and recrystallized from ethylene chloride three times. The pure compound is a while crystalline solid, melting point 148°–153° C. (not sharp), with charring and bubbling. As thus produced it is a hemihydrate.

We claim:

1. Compounds of the group consisting of those having the general formula:

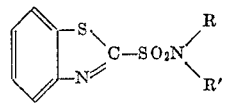

in which R and R' are members of the group consisting of hydrogen, lower alkyl and 2-thiazolyl radicals.

2. Compounds of the group consisting of those having the general formula:

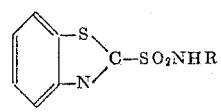

in which R is a lower alkyl radical.

3. 2-benzothiazolesulfonamide.
4. 2-benzothiazolesulfon-n-propylamide.
5. 2-benzothiazolesulfon-di-n-butylamide.
6. N-(2-thiazolyl) benzothiazole-2-sulfonamide.
7. A method of preparing compounds having the general formula:

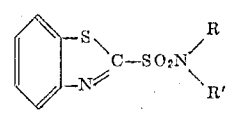

in which R and R' are members of the group consisting of hydrogen, lower alkyl and 2-thiazolyl radicals which comprises reacting a mercaptobenzothiazole with chlorine in the presence of an aqueous acid solution and subsequently with a member of the group consisting of ammonia, a lower alkyl amine and 2-aminothiazole.

8. A method of preparing compounds having the general formula:

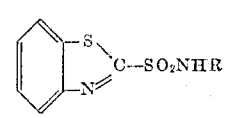

in which R is a lower alkyl radical which comprises dissolving 2-mercaptobenzothiazole in an aqueous acid solution, passing chlorine into said solution, mixing the resulting product with a lower akylamine and recovering said product therefrom.

9. A method of preparing 2-benzothiazolesulfonamide which comprises dissolving 2-mercaptobenzothiazole in an aqueous acetic acid solution, passing chlorine into said solution, mixing the resulting product with ammonium hydroxide and recovering said 2-benzothiazolesulfonamide therefrom.

10. A method of preparing 2-benzothiazolesulfon-n-propylamide which comprises dissolving 2-mercaptobenzothiazole in aqueous acetic acid solution, passing chlorine into said solution, mixing the resulting product with N-propylamine and recovering said compound therefrom.

11. A method of preparing 2-benzothiazole-sulfon-di-n-butylamide which comprises dissolving 2-mercaptobenzothiazole in aqueous acetic acid solution, passing chlorine into said solution, mixing the resulting product with di-n-butylamine and recovering the said product therefrom.

12. A method of preparing N-(2-thiazolyl)-benzothiazole-2-sulfonamide which comprises dissolving 2-mercaptobenzothiazole in aqueous acid solution, passing chlorine into said solution, mixing the resulting product with 2-aminothiazole and recovering said product therefrom.

JAMES W. CLAPP.
RICHARD O. ROBLIN, Jr.

REFERENCES CITED

The following references are of record in the file of this patent:

UNITED STATES PATENTS

| Number | Name | Date |
|---|---|---|
| 2,367,058 | Roblin | Jan. 9, 1945 |